(No Model.)
L. M. HALSEY.
SLIDE CARRIER.
No. 577,022.
Patented Feb. 16, 1897.
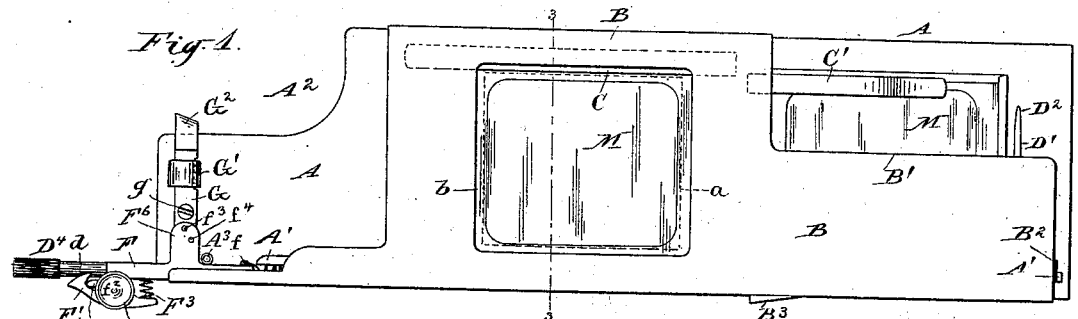
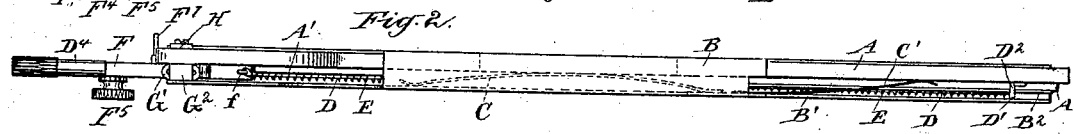
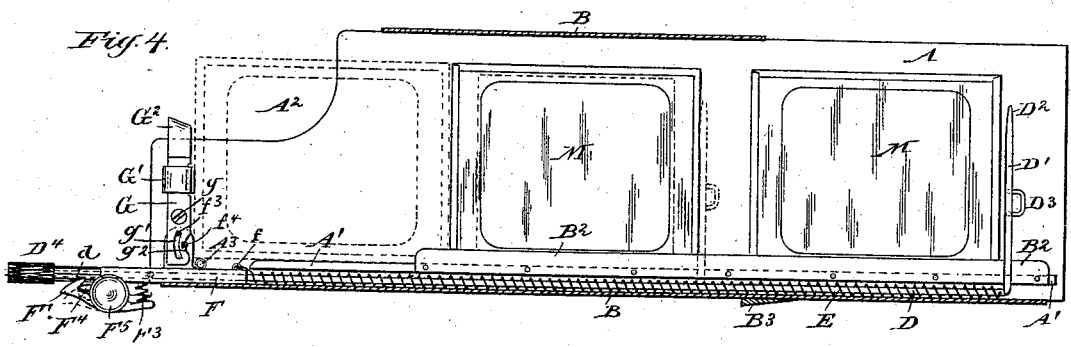
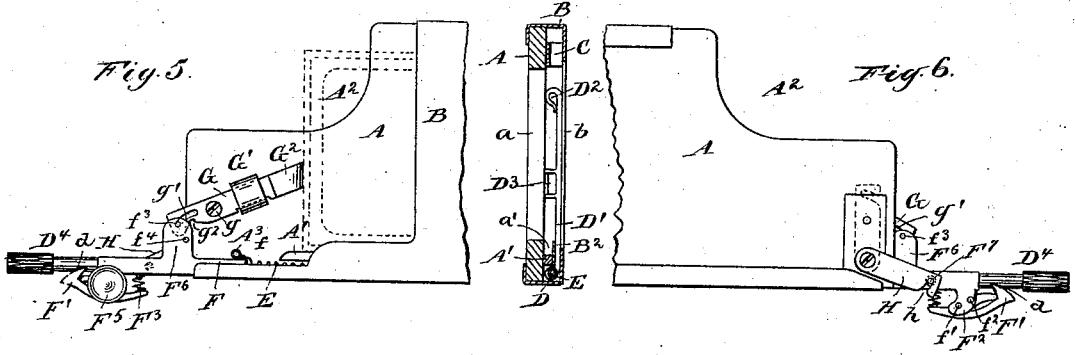
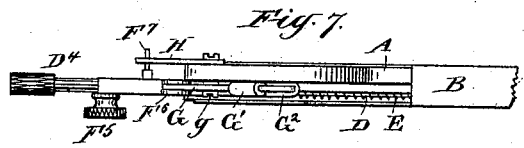
Witnesses:
Robt. Connor
Geo. W. Case Jr.
Inventor:
Louis M. Halsey,
by his attorney
Charles R. Searle

UNITED STATES PATENT OFFICE.

LOUIS M. HALSEY, OF BROOKLYN, NEW YORK.

SLIDE-CARRIER.

SPECIFICATION forming part of Letters Patent No. 577,022, dated February 16, 1897.

Application filed April 30, 1896. Serial No. 589,622. (No model.)

*To all whom it may concern:*

Be it known that I, LOUIS M. HALSEY, a citizen of the United States, residing in Brooklyn, in the county of Kings and State of New York, have invented a certain new and useful Improvement in Slide-Carriers, of which the following is a specification.

The invention relates to devices used with instruments of projection, such as magic lanterns and stereopticons, to hold and guide the thin transparent plates or slides upon which are the views or pictures to be projected upon the screen as they are successively presented.

In the ordinary forms of carriers the slides are pushed into and across the line of illumination one after the other by hand, the next following displacing the one previously centered on the axial line of the lenses by forcing it along out of such line. The change from one view to the next, as thus effected, is slow and tiresome to the eyes, and as there is an opaque margin of considerable width at each side of the slide the passage of the two adjacent edges causes an objectionable darkening of the screen during that period.

In my invention the transfer is made mechanically by releasing a spring-actuated rod having an arm arranged to impinge against the rear edge of the slide to be next shown and force it along, the forward edge striking the rear edge of the previously-centered slide and carrying both forward until the latter strikes a stop so adjusted relatively to the length of the slides that when they come to rest the second shall be exactly centered. The change is practically instantaneous and the darkened period so brief as to be almost inappreciable.

The accompanying drawings form a part of this specification, and represent what I consider the best means of carrying out the invention.

Figure 1 is a face view of the front of the carrier. Fig. 2 is a top view of the same. Fig. 3 is a cross-section on the line 3 3 in Fig. 1. Fig. 4 is a view corresponding to Fig. 1, but with certain portions removed to better show the working parts. Fig. 5 is a face view of a portion showing the parts conditioned for use with longitudinally narrower slides. Fig. 6 is a corresponding view of the back face. Fig. 7 is a top view of the same.

Similar letters of reference indicate the same parts in all the figures.

A is a thin frame of mahogany or other well-seasoned wood or similar light and strong material, having an opening $a$, something larger than the opening in a slide-mat, and a strip or ledge A', extending longitudinally of the frame at a sufficient distance below the opening $a$ to support the slides M, resting on the ledge, with their centers in line with the center of the opening.

B is a casing of tinned sheet-iron or other thin metal cut and bent to the form shown and secured to the frame A by suitable fastenings, leaving a narrow space between and having an opening $b$, matching the opening $a$. The slides M are fed successively through the space and are lightly held by the frictional contact of a flat spring C, soldered at one end to the interior face of the casing above the opening $b$. Another similar spring C', secured to the casing, extends along the frame on the side at which the slide is introduced, and serves to hold it in place against the frame ready to be next shown. The casing is cut away, as shown at B', to facilitate the entry of the slides.

$B^2$ is a strip or flange of sheet metal secured by small nails to the face of the ledge A' and forming, with the adjacent surface of the frame, a groove $a'$ of a width just sufficient to receive the lower edge of a single slide engaged and guided therein with liberty to move longitudinally, but restrained against lateral movement.

D is a rod lying in the space within the frame and casing below the ledge A'. It extends, when "set," from a point near the end of the frame on the receiving side, longitudinally of the casing in the position shown, to and a little beyond the delivery end. The inner end of the rod is provided with a vertical arm D', curved outward at the junction to avoid the ledge A', and reaching upward, parallel with the face of the frame, to a point near the upper edge of the slides, terminating in a loop $D^2$, touching the frame, and serving to engage the rear edge of a slide mounted in the groove $a'$. A staple-like loop $D^3$, having its legs joined to the arm at about the mid-height of the latter and its bight bent back at a right angle to lie against the face of the frame, serves to guide the free end of the rod by filling the space between the inner face of the casing B and the frame. The opposite end of the rod extends loosely through a guide F, rectangular in cross-section, lying in the angle formed by the junction of the bottom of the casing with the frame. A contractile spiral spring E, attached at one end to the lug $f$ on the guide, incloses the rod D and extends to the arm D', to which its opposite end is secured. When distended, it exerts its force to drive the rod and its arm D' toward the delivery end, and is held by the hooked spring-catch F' engaged in a notch $d$ on the under side of the head $D^4$ on the rod D beyond the guide F. The catch F' is mounted loosely on a pin $f'$ between the wings $F^2$, depending from the guide F, and is held in engagement by the spring $F^3$. Its beveled hook is lowered and the rod released, when desired, by the downward pressure of a dog $F^4$, fixed on a pin $f^2$, carried in the wings and operated by turning the milled button $F^5$, fast on the same pin. It reëngages the notch $d$ automatically when the rod D is again thrust inward against the force of the spring E.

$F^6$ is a lug provided on the upper face of the guide F and cut to form two leaves receiving between them a lever G, secured to the frame A by the screw $g$ and carrying a cushion or buffer G', of soft vulcanized rubber, in the form of a band or short length of rubber tubing inclosing the lever and held in place thereon by engaging in a shallow notch cut in the edge of the latter. The function of the lever is to arrest the motion of the slide to be removed by receiving its advancing edge upon the cushion G', which softens the force of the blow, reduces the danger of breaking, and more particularly subdues the noise caused by the impact.

The carrier, as described in the foregoing, is conditioned to work successfully with slides of the standard American size, three and one-fourth by four inches, and the operation is as follows: The rod D being thrust fully in and engaged by the catch F' and a slide M having been preliminarily placed by hand in the groove $a'$ over the opening $a$, a second slide is introduced between the spring C' and the frame anywhere in the space between the rear edge of the first and the arm D'. When the first view has been sufficiently long upon the screen, the operator turns the button $F^5$ in the direction to lower the catch F' and release the rod D, which, under the strong pull of the spring E, instantly drives forward, bringing the arm D' into contact with the rear edge of the second slide, starting it also forward and causing its forward edge to strike the rear edge of the first slide, carrying both forward until the front edge of the first contacts with the cushion G' and further movement is arrested with the second slide exactly centered in the openings $a\,b$. The first slide is now removed by grasping it at the forward upper corner in the offset $A^2$, provided for that purpose in the frame, and tilting that edge to clear the lever G it is withdrawn from the groove and casing and laid aside. The rod is again pushed inward and engaged and the next slide to be exhibited is inserted between the spring C' and the frame and the operation repeated until all are shown.

The lever G must of course be carefully located at such distance relatively to the openings $a\,b$ and the length of the slides as to have the latter come to rest in the correct position. The second slide is held lightly by the spring C, and the pull of the spring E is so adjusted that its force is expended before the cushion G' is struck, the momentum of the slides being sufficient to insure their full travel.

If slides of the English standard—three and one-fourth by three and one-fourth inches—are to be shown, the distance between the center of the opening $a$ and the lever G must be accordingly diminished, so that those slides will also center. To accomplish this, the guide F and its connections, including the rod D and its arm D', are drawn outward far enough to turn the lever G into the position shown in Fig. 5 and bring the pin $F^7$, before inoperative, into such relation to the pivoted hook-lever H, attached to the rear face of the frame, as to be engaged by the narrow notch $h$ thereon. The lever is then turned down, as shown in Figs. 6 and 7, and holds the parts in the new position. The end of the lever G now lies with the working face of its cushion $G^2$ perpendicular and receives the impact of the slides, as before, and stops the first slide at a point nearer the opening than before, but properly spaced to serve with the shorter slides. The operation is otherwise the same as above described.

The lower end of the lever G between the leaves of the lug $F^6$ is peculiarly shaped. It has a slot $g'$, running generally lengthwise of the lever, engaged by a pin $f^3$, extending through both leaves and serving as a stop to limit the motion of the lever in turning it to the last-described position in conjunction with the pin $F^7$ and its hook-lever H.

Another cross-pin $f^4$ matches to a notch $g^2$, cut in the side of the lever G, and aids to brace the lever against any tendency to turn back when in the upright position first described.

$A^3$ is a pin set in the front face of the frame A with its under side close to the upper face of the guide F, to prevent the latter lifting and becoming displaced. It will be observed that the guide and its connections are unattached and free except as held by the screw $g$, on which the lever G turns, and the outward movement in adjusting for the smaller slides does not affect the initial force of the spring E, because all the parts, including the spring, are moved along together. The spring follows farther than before, which is an advantage for the reason that the length of travel of the slides is shorter and the momentum consequently less.

The rod D is held against lifting by the ledge A' and against displacement in other directions by the loop D² and staple D³ bearing against the face of the frame and the arm D' against the inner face of the casing B.

B³ is a stop secured to the under face of the casing at the proper point to abut against an adjacent portion of the lantern-framing forming the slideway (not shown) when the openings in the carrier are centered on the line of illumination, to hold the carrier and resist any tendency to "crawl" or move forward in the direction taken by the slides, due to the momentum of the moving parts in making the rapid changes from one view to the next. It may, if preferred, be made adjustable to enable the operator to vary the position as required for different sizes or makes of lanterns.

The almost instantaneous change of slides produced by my invention is particularly pleasing to the spectators and reduces to a minimum the period of darkening the screen by the passage of adjacent mat-margins across the beam of light and the attending fatigue to the eye caused by the alternating periods of brilliancy and darkness.

The large and convenient space provided for the introduction of the slides with certainty in my carrier is important for the reason that the operation is usually conducted in a dim light, and all provisions tending to facilitate the correct placing and easy removal of the slides will be appreciated. The mechanism is not complicated and not liable to disarrangement. The carrier is not expensive to manufacture and is almost noiseless in its working.

Modifications may be made in the forms and proportions within wide limits without departing from the principle of the invention or sacrificing its advantages.

The frame and casing may both be of sheet metal, if preferred, or other materials suitable for the purpose may be employed. Other forms of releasing-gear may be substituted for the catch shown.

I claim—

1. A slide-carrier comprising a frame having an opening over which the slide to be shown centers, a spring-actuated rod and an arm rigid therewith and extending upward therefrom for engaging the rear edge of the succeeding slide lying in the rear of and in the same plane with the first and imparting motion to both, a releasing mechanism for holding and liberating the rod, and a stop connected with the guide of said rod and arranged in the path of the slides to receive the forward edge of the first and thereby arrest the motion when the succeeding slide is centered over the said opening, all substantially as herein specified.

2. A slide-carrier comprising a frame having an opening over which the slide to be shown centers, a spring-actuated rod and its upwardly-extending arm for engaging the rear edge of the succeeding slide lying in the rear of and in the same plane with the first and imparting motion to both, a releasing mechanism for holding and liberating the rod, a stop arranged in the path of the slides to receive the forward edge of the first and thereby arrest the motion when the succeeding slide is centered over said opening, and means for varying the position of the stop to adapt the carrier for use with slides of differing sizes, all substantially as herein specified.

3. The frame A having the opening $a$, the ledge A' thereon for supporting the slides, and the casing B secured to the frame and having a space between the two and having the opening $b$, in combination with the rod D and its actuating-spring E guided in the space below said ledge, the arm D' carried on said rod near one end, the catch F' for holding and releasing the latter, and the lever G connected with the guide of said rod near the other end and cushion G', all arranged to serve substantially as herein specified.

4. The frame A having the opening $a$, the ledge A' and its flange B² thereon, the casing B having the opening $b$, in combination with the rod D and its actuating-spring E, the arm D' having the loop D² and staple D³ for guiding the free end of the rod and engaging a slide, the guide F receiving the opposite end, the catch F' carried on said guide for holding and releasing said rod, and the lever G and cushion G' thereon, all arranged to serve substantially as herein specified.

5. The frame A and casing B having the openings $a\ b$, the rod D and its arm D', the guide F receiving the rod, and the spring E secured at one end to the guide and at the other to the rod, in combination with the catch F' for holding and releasing the rod, the lever G turning on the screw $g$ and having the slot $g'$, and the pin $f^3$ carried by said guide and engaged in the slot to limit the turning motion of the lever, all arranged to serve substantially as herein specified.

6. The frame A and casing B having the openings $a\ b$, the rod D and its arm D', the guide F receiving the rod, the actuating-spring E for the latter, in combination with the catch F' for holding and releasing the rod, the lever G turning on the pivot $g$ and connected to said guide, the pin $F^7$ carried on the latter and the hook-lever H mounted on the frame to engage the said pin, all arranged to serve substantially as herein specified.

7. The frame A and casing B having the openings $a\ b$, the rod D and its arm D', the guide F receiving the rod, and the actuating-spring E for the latter, in combination with the catch F' for holding and releasing said rod, the lever G turning on the pivot $g$ and having the slot $g'$, the pin $f^3$ carried by said guide and engaged in said slot to limit the turning motion of the latter, the pin $F^7$ on the guide and the hook-lever H mounted on the frame to engage said pin and lock the guide and its connections in position, all arranged to serve substantially as herein specified.

8. The frame A and casing B having the openings $a\ b$, the rod D and its arm D', the guide F receiving the rod, and the actuating-spring E for the latter, in combination with the stop $B^3$, the catch F' for holding and releasing the rod, the lever G turning on the pivot $g$ and connected to the said guide, the cushions G', $G^2$ carried on the lever, and the pin $A^3$ for holding the guide in place, all arranged to serve substantially as herein specified.

In testimony that I claim the invention above set forth I affix my signature in presence of two witnesses.

LOUIS M. HALSEY.

Witnesses:
ROBT. CONNOR,
GEO. W. CASE, Jr.